United States Patent
Sakazaki

(10) Patent No.: US 7,810,524 B2
(45) Date of Patent: Oct. 12, 2010

(54) RESIN COMPOSITE HOSE AND METHOD FOR PRODUCING THE SAME

(75) Inventor: Kazushige Sakazaki, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 843 days.

(21) Appl. No.: 11/692,216

(22) Filed: Mar. 28, 2007

(65) Prior Publication Data

US 2007/0227610 A1 Oct. 4, 2007

(30) Foreign Application Priority Data

Mar. 28, 2006 (JP) ............................. 2006-089392
Mar. 23, 2007 (JP) ............................. 2007-076470

(51) Int. Cl.
*F16L 9/14* (2006.01)

(52) U.S. Cl. ..................... 138/141; 138/140; 138/137; 138/177; 138/DIG. 11; 428/36.91

(58) Field of Classification Search ................ 138/137, 138/141, DIG. 11, 140; 428/36.91
See application file for complete search history.

(56) References Cited

U.S. PATENT DOCUMENTS

| | | | | |
|---|---|---|---|---|
| 3,939,243 A | * | 2/1976 | Dawson | 264/296 |
| 4,440,712 A | * | 4/1984 | Imgram | 264/209.5 |
| 5,804,268 A | * | 9/1998 | Mukawa | 428/36.4 |
| 5,848,619 A | * | 12/1998 | Ally | 138/177 |
| 5,937,912 A | * | 8/1999 | Ally | 138/177 |
| 6,883,552 B2 | * | 4/2005 | Ooyauchi et al. | 138/177 |
| 6,923,218 B2 | * | 8/2005 | Kumagai et al. | 138/109 |
| 7,264,021 B1 | * | 9/2007 | Daikai | 138/124 |
| 2004/0154732 A1 | * | 8/2004 | Mason et al. | 156/221 |
| 2005/0003128 A1 | * | 1/2005 | Smith et al. | 428/36.91 |
| 2007/0227610 A1 | * | 10/2007 | Sakazaki | 138/177 |
| 2008/0263937 A1 | * | 10/2008 | Butera | 43/96 |

FOREIGN PATENT DOCUMENTS

| | | |
|---|---|---|
| JP | 11-090993 | 4/1999 |
| JP | 2002-054779 | 2/2002 |

\* cited by examiner

*Primary Examiner*—Patrick F Brinson
(74) *Attorney, Agent, or Firm*—Andrus, Sceales, Starke & Sawall, LLP

(57) ABSTRACT

A resin composite hose includes a curved portion at an axial position thereof, and has a multilayer construction including a resin layer having permeation resistance to a transported fluid and serving as a barrier layer, an inner rubber layer and an outer rubber layer. The curved portion has a shape of progressively increasing a circumferential length while being flattened progressively increasingly from a curve beginning end of a perfect circle in cross-section to a curve terminal end or a curve middle portion of a flattened circle.

13 Claims, 13 Drawing Sheets a b c

RESIN COMPOSITE HOSE AND METHOD FOR PRODUCING THE SAME

BACKGROUND OF THE INVENTION

1. Field of the Invention

The present invention relates to a resin composite hose of curved shape including a resin layer that is disposed in the middle of multilayers, has a permeation resistance to a transported fuel and serves as a barrier layer, and a method for producing such a resin composite hose of curved shape.

2. Description of the Related Art

For application of a fluid transporting hose, for example, a fuel hose in a motor vehicle, a typical rubber hose made of a blend of acrylonitrile-butadiene rubber and polyvinyl chloride (NBR/PVC blend, NBR+PVC) or the like has been conventionally used. Such rubber hose has a high vibration-absorbability, easiness of assembly, and an excellent permeation resistance to a fuel (gasoline).

However, recently, in view of global environmental conservation, regulations on restriction of permeation of motor vehicle fuel has been tightened, and demand for fuel permeation resistance is expected to increase more and more in future.

As a countermeasure against that, developed and used is a resin composite hose including a resin layer that is laminated as an inner surface layer on an inner side of an outer rubber layer, has an excellent filet permeation resistance and serves as a barrier layer.

However, the resin layer as the barrier layer is hard since resin is a material harder than rubber. So, in a hose including the resin layer laminated on an inner side of the outer rubber layer to an extreme end thereof (an axial end of the hose), when the hose is fitted on a mating pipe, a sealing property becomes insufficient due to poor bonding between the mating pipe and the resin layer that defines an inner surface of the hose.

And, since the resin layer defining the inner surface of the hose is hard and has a large deformation resistance, a great force is required for fitting or slipping the hose on the mating pipe. This causes a problem that easiness of connection of the hose and the mating pipe is impaired.

For the purpose of solution of the problem, a hose as shown in FIG. 8 is disclosed in Patent Document 1 below.

In the Figure, reference numeral 200 indicates a resin composite hose, reference numeral 202 indicates an outer rubber layer, and reference numeral 204 is a resin layer that is laminated on an inner surface of the outer rubber layer 202 as a barrier layer.

In the resin composite hose 200, on an end portion thereof to be connected to a mating pipe 206 made of metal, the resin layer 204 is not laminated, and an inner surface of the outer rubber layer 202 is exposed so as to be fitted on the mating pipe 206 directly and elastically in contact relation.

And, in order to prevent a problem that a fuel flowing inside penetrates between the exposed inner surface of the outer rubber layer 202 and the mating pipe 206, and permeates outside through the end portion of the outer rubber layer 202 on which the resin layer 204 is not laminated, in the resin composite hose 200, an annular grooved portion 208 is formed in an end portion of the resin layer 204, a ring-shaped elastic sealing member 210 made of a material such as fluoro rubber (FKM), and having high fuel permeation resistance is attached therein. The resin composite hose 200 is fitted on the mating pipe 206 so as to elastically contact an inner surface of the elastic sealing member 210 with the mating pipe 206.

Meanwhile, reference numeral 212 indicates a bulge portion bulging annularly in a radially outward direction on a leading end portion of the mating pipe 206, reference numeral 214 indicates a hose clamp for fixing the end portion of the outer rubber layer 202 on the mating pipe 206 by tightening in a diametrically contracting direction an outer peripheral surface of the end portion of the outer rubber layer 202 on which the resin layer 204 is not laminated.

In the resin composite hose 200 shown in FIG. 8, the resin layer 204 is not laminated on an end portion of the resin composite hose 200. Therefore, a great resistance is not exerted by the resin layer 204 when the resin composite hose 200 is fitted on the mating pipe 206, and thereby the resin composite hose 200 can be fitted thereon easily with a small force.

And, in the end portion of the resin composite hose 200, the inner surface of the outer rubber layer 202 having elasticity contacts directly with the mating pipe 206, and a good sealing property can be provided between the mating pipe 206 and a portion of the resin composite hose 200 fitted thereon.

By the way, the fuel hose typically has a predetermined curved shape since the fuel hose has to be arranged so as not to interfere with peripheral parts and components.

A typical rubber hose of such curved shape is produced in a following manner as disclosed in Patent Document 2 below. An elongated and straight tubular rubber hose body is formed by extrusion, and the elongated and straight tubular rubber hose body is cut to a predetermined length to obtain a straight tubular rubber hose body 216 that is not vulcanized (or is semivulcanized). Then, as shown in FIG. 9, the straight tubular rubber hose body 216 is fitted on a mandrel 218 that is made of metal and has a predetermined curved shape to be deformed into a curved shape. Before molding or fitting, a mold release agent is applied to a surface of the mandrel 218. The curved tubular rubber hose body is vulcanized with being fitted on the mandrel 218 by heating for a predetermined time. When vulcanization is completed, the hose 220 of curved shape is removed from the mandrel 218, and washed, thereby the hose 220 of curved shape as a finished product can be obtained.

However, in case of the resin composite hose 200 shown in FIG. 8, such production method cannot be employed. In case of the resin composite hose 200 shown in FIG. 8, first of all, the outer rubber layer 202 is solely formed by injection molding, and the resin layer 204 is formed on the inner surface of the outer rubber layer 202 so as to follow a shape of the inner surface thereof.

For formation of the resin layer 204 so as to follow the shape of the inner surface of the outer rubber layer 202, electrostatic coating means is suitably applied.

The electrostatic coating is applied in such manner that an injection nozzle is inserted inside a hose, specifically inside the outer rubber layer 202, and resin powder is sprayed from the injection nozzle onto an inner surface of the hose, thereby the inner surface of the outer rubber layer 202 is electrostatically coated with the resin powder.

In the electrostatic coating, a resin membrane is formed in such manner that negatively or positively charged resin powder (typically, negatively charged resin powder) is sprayed from the injection nozzle, and the resin powder flies to and is attached to the inner surface of the outer rubber layer 202 as counter electrode (positive electrode) by electrostatic field.

In steps of such an electrostatic coating, in order to form the resin layer 204 with an intended thickness, usually, more than one cycles of electrostatic coating are performed. Specifically, after the resin powder is attached on the inner surface of the outer rubber layer 202, the resin powder is melted by heating and then cooled. Then, another resin powder is attached on the resin powder by further spraying the resin powder thereto by an electrostatic coating and the another resin powder is melted by heating and then cooled. In this manner, the cycle of electrostatic coating is repeated until the resin layer 204 with an intended wall thickness is formed.

In this case, overall production steps are as follows.

First, the outer rubber layer 202 is formed by injection molding. Then, the outer rubber layer 202 is dried, washed in pretreatment process and dried again. Subsequently, resin powder is attached to an inner surface of the outer rubber layer 202 by electrostatic coating. The resin powder thereon is melted by heating and then cooled. After that, a second cycle of the electrostatic coating (attaching by electrostatic coating, melting and cooling of resin powder) is performed, and this cycle (attaching by electrostatic coating, melting and cooling of resin powder) is repeated to obtain the resin layer 204 with the intended wall-thickness. After the resin layer 204 is completed, a ring-shaped elastic sealing member 210 having fuel permeation resistance is inserted through an axial end of the outer rubber layer 202 to be placed in a predetermined position.

As stated above, a number of steps are required for producing the resin composite hose 200 shown in FIG. 8, and therefore, production cost of the resin composite hose 200 is necessarily increased.

Although the above are described with reference to a fuel hose as an example. The similar problems arc anticipated in common to any resin composite hose including a resin layer that defines an inner surface layer on inner side of an outer rubber layer in order to prevent permeation of a transported fluid and serves as a barrier layer having a permeation resistance to the transported fluid.

Accordingly, the inventor of the present invention devised a resin composite hose of a multilayer construction in which an inner rubber layer is further laminated on an inner side of a resin layer as an inner surface layer.

The resin composite hose of the multilayer construction can be provided with permeation resistance (barrier property) to a transported fluid by the resin layer. Further, the inner rubber layer that defines an inner surface of the resin composite hose is elastically deformed when the resin composite hose is fitted on a mating pipe, thereby allows a worker to easily fit the resin composite hose on the mating pipe with a small force, namely to easily connect the resin composite hose to the mating pipe with a small force.

And, since the resin composite hose is connected to the mating pipe so as to elastically contact the inner rubber layer with the mating pipe, a good sealing property can be provided between the mating pipe and a portion of the resin composite hose connected thereto.

And, in the resin composite hose of the multilayer construction, since the resin layer can be formed to an axial edge of the hose, an expensive ring-shaped sealing member 210 having high permeation resistance to a transported fluid as shown in FIG. 8 can be omitted.

In addition, in the resin composite hose of the multilayer construction, since the resin layer can be formed to the axial edge of the hose, it becomes possible to produce the resin composite hose that has a curved shape in the same production method as shown in FIG. 9.

Specifically, a straight tubular hose body is formed with a multilayer construction by successively laminating the inner rubber layer, the resin layer and the outer rubber layer on one another by extrusion. The straight tubular hose body is unvulcanized or semivulcanized. Then, the straight tubular hose body is fitted on a mandrel that has a predetermined curved shape to be deformed, the curved tubular hose body with being fitted on the mandrel is vulcanized by heating, and thereby a resin composite hose of curved shape can be obtained.

In this production method, it becomes possible to produce a resin composite hose at much lower cost than before.

However, the inventors test-produced a resin composite hose of curved shape in this manner, and found that the following problem was caused.

FIG. 10 illustrates this problem concretely.

An elongated tubular hose body is formed by extrusion and cut to a predetermined length whereby a tubular hose body of straight shape indicated at reference numeral 222 in FIG. 10A is obtained. The tubular hose body 222 is unvulcanized (or is semivulcanized) and has a multilayer construction comprising an outer rubber layer 202, a resin layer 204 and an inner rubber layer 224 that defines an inner surface of the tubular hose body 222.

When the tubular hose body 222 is fitted on a mandrel 218 having a curved shape, the resin layer 204 exhibits wave-shaped deformation behavior on inner side of a curved portion of the hose body 222, with the consequence that the outer rubber layer 202 also exhibits similar wave-shaped deformation behavior.

The reason for creation of such wave-shaped deformation is estimated as follows.

When the tubular hose body 222 is fitted on the mandrel 218, on an outer side of the curved portion, a pull-force in an axial direction is exerted on the tubular hose body 222, and the tubular body 222 tends to be elongated in the axial direction (axial direction of the hose) while decreasing in wall thickness on the outer side thereof.

On the other hand, on an inner side of the curved portion, an axial compression force is exerted on the tubular hose body 222, and the tubular hose body 222 tends to be forcibly contracted in the axial direction while slightly increasing in wall thickness.

When a hose does not include the resin layer 204 and comprises a rubber layer alone (or a rubber layer and a reinforcing layer), the hose can comply with deformation by pull-out force and deformation under compression, namely, the tubular hose body 222 can be deformed so as to follow the curved shape of the mandrel 218 sufficiently without creating wave-shaped deformation as stated above.

However, in a resin composite hose having the resin layer 204, the resin layer 204 cannot be deformed so as to follow the curved shape of the mandrel 218 favorably, in particular, on the inner side of the curved portion of the resin layer 204, an excess length or loosening is created due to dimensional contraction caused by compression in the axial direction, slack in the axial direction is created thereon, and as a result, wave-shaped deformation is created as shown in FIG. 10B.

[Patent Document 1] JP-A, 2002-54779
[Patent Document 2] JP-A, 11-90993

Under the foregoing circumstances, it is an object of the present invention to provide a resin composite hose that can prevent wave-shaped deformation behavior in a resin layer and has an excellent permeation resistance to a transported fluid, and to provide a method for producing the same.

SUMMARY OF THE INVENTION

According to the present invention, there is provided a novel resin composite hose. The resin composite hose includes a curved portion at an axial position or a certain axial position thereof, and has a multilayer construction. The resin composite hose or the multilayer construction comprises a resin layer having permeation resistance to a transported fluid and serving as a barrier layer, an inner rubber layer as an inner surface layer laminated on an inner side of the resin layer and an outer rubber layer laminated on an outer side of the resin layer. The curved portion has a shape progressively increasing a circumferential length, for example, while being flattened progressively increasingly from a curve beginning end of a perfect circle in cross-section to a curve terminal end or a curve middle portion of a flattened circle such as an ellipse or an elongated circle in cross-section, or while being flattened. For example, a cross-sectional area of a fluid path of the curve beginning end of a perfect circular cross-section is set a minimum cross-sectional area of a fluid path through the curved portion, or from the curve beginning end to the curve middle portion. Namely, any cross-sectional area of a fluid path is maintained not less than the cross-sectional area of the fluid path of the curve beginning end of the perfect circular cross-section through the curved portion, or from the curve beginning end to the curve middle portion, or any cross-sectional area of a fluid path is maintained equal to or greater than the cross-sectional area of the fluid path of the curve beginning end of the perfect circular cross-section through the curved portion, or from the curve beginning end to the curve middle portion.

Any cross-sectional shape of the curved portion has a first axis passing from side to side thereof through a center thereof and a second axis passing from side to side thereof through the center thereof and perpendicular to the first axis. And the curved portion may be flattened progressively increasingly from the curve beginning end to the curve terminal end in such a manner that the first axis of the cross-sectional shape is maintained constant and the second axis thereof is progressively increased A second curved portion may be provided at an axial position other than the axial position of the curved portion as a first curved portion, and the second curved portion may be formed as a cross-sectional shape transitional portion so as to be progressively changed or transformed in a cross-sectional shape from a flattened circle of a cross-sectional shape of a curve beginning end thereof to a perfect or nearly perfect circle of a cross-sectional shape of a curve terminal end or a curve middle portion thereof, or so as to form a transition in a cross-sectional shape from a curve beginning end of a flattened circular cross-section to a curve terminal end or a curve middle portion of a perfect or nearly perfect circular cross-section.

A straight portion may be provided between the first curved portion and the second curved portion. The straight portion extends straight in an axial direction of the resin composite hose with a cross-sectional shape thereof being maintained in a flattened circle identical to a cross-sectional shape of the curve terminal end of the first curved portion.

According to the present invention, there is provided a novel method for producing the resin composite hose as stated above. The method comprises a step of forming a tubular hose body of a straight shape with the multilayer construction by successively laminating the inner rubber layer, the resin layer and the outer rubber layer on one another by extrusion. The tubular hose body is plastically deformable, and unvulcanized or semivulcanized. The method further comprises a step of preparing a mandrel having a shape corresponding to a shape of an inner surface of the resin composite hose including the curved portion, a step of relatively fitting the tubular hose body on the mandrel and deforming the tubular hose body to obtain a tubular hose body of curved shape, and a step of vulcanizing the tubular hose body of curved shape to obtain the resin composite hose including the curved portion.

As stated above, a resin composite hose of the present invention of a multilayer construction including a resin layer, an inner rubber layer as an inner surface layer laminated on an inner side of the resin layer, and an outer rubber layer laminated on an outer side of the resin layer, is provided with a curved portion at a certain axial position thereof. The curved portion has a shape progressively increasing a circumferential length. And, the curved portion may be flattened progressively increasingly from a curve beginning end of a perfect circle in cross-section to a curve terminal end or a curve middle portion of a flattened circle such as an ellipse or an elongated circle in cross-section, or the curved portion may be flattened. A cross-sectional area of a fluid path of the curve beginning end, namely an inner cross-sectional area of the curve beginning end is set a minimum cross-sectional area of a fluid path in the curved portion, or in a certain area of the curved portion.

In the resin composite hose according to the present invention, the curved portion may have a shape of progressively increasing a circumferential length and a flattened degree of a cross-sectional shape thereof from the curve beginning end of a perfect circular cross-section to the curve terminal end or the curve middle portion of a flattened circular cross section. So, when an unvulcanized or semivulcanized tubular hose body of a straight shape is fitted on the mandrel having the corresponding curved shape to provide the tubular hose body with the curved shape, the resin layer does not exhibit waveshaped deformation behavior on an inner side as well as on an outer side of the curved portion, and therefore, the tubular hose body can be provided with a curved shape as intended through an entire length thereof.

The reason why wave-shaped deformation is created on the inner side of the curved portion as stated above is because the inner side of the curved portion is contracted in the axial direction and thereby an excess length, slack or loosening in the axial direction is created.

Here, according to the present invention, the curved portion has a shape of progressively increasing a circumferential length while being flattened progressively increasingly or while being flattened. Therefore, during fitting of the tubular hose body on the mandrel, an excess length, namely slack or loosening created on the inner side of the curved portion is absorbed, offset or eliminated by radial expansion of the curved portion. As a result, the resin layer is prevented from above wave-shaped deformation behavior on the inner side of the curved portion, and thereby the rubber layer is also prevented from deformation behavior.

Here, the above curved portion may be flattened progressively increasingly from the curve beginning end to the curve terminal end in such a manner that a first axis of the cross-sectional shape is maintained constant and a second axis thereof is progressively increased. Here, the first axis is an axis or diameter of any cross-sectional shape of the curved portion passing from side to side thereof through a center thereof, and the second axis is an axis or diameter of any cross-sectional shape thereof passing from side to side thereof through the center thereof and perpendicular to the first axis.

The resin composite hose may be provided with a second curved portion at an axial position other than the axial position of the curved portion as a first curved portion, and the second curved portion may serve as a cross-sectional shape transitional portion for transforming a flattened circular cross-sectional shape formed by the first curved portion to a perfect or nearly perfect circular cross-sectional shape.

In this case, a straight portion may be provided between the first curved portion and the second curved portion as a cross-sectional shape transitional portion. The straight portion extends straight in an axial direction of the resin composite hose while its cross-sectional shape being maintained in a flattened circle identical to a cross-sectional shape of the curve terminal end of the first curved portion.

And, the method for producing the resin composite hose of the present invention comprises a step of forming a tubular hose body of a straight shape with the multilayer construction by successively laminating the inner rubber layer, the resin layer and the outer rubber layer on one another by extrusion. Here, the tubular hose body is plastically deformable, and unvulcanized or semivulcanized. The method further includes a step of preparing a mandrel having a shape corresponding to a shape of the resin composite hose including the curved portion, a step of relatively fitting the tubular hose body on the mandrel and deforming the tubular hose body to obtain a tubular hose body of curved shape, and a step of vulcanizing the tubular hose body of curved shape together with the mandrel to obtain the resin composite hose including the curved portion. In this production method, above resin composite hose of curved shape can be easily produced in a small number of steps, and therefore can be produced at much lower cost than before.

Now, the preferred embodiments of the present invention will be described in detail with reference to the drawings.

DETAILED DESCRIPTIONS OF PREFERRED EMBODIMENTS

Figure 1:
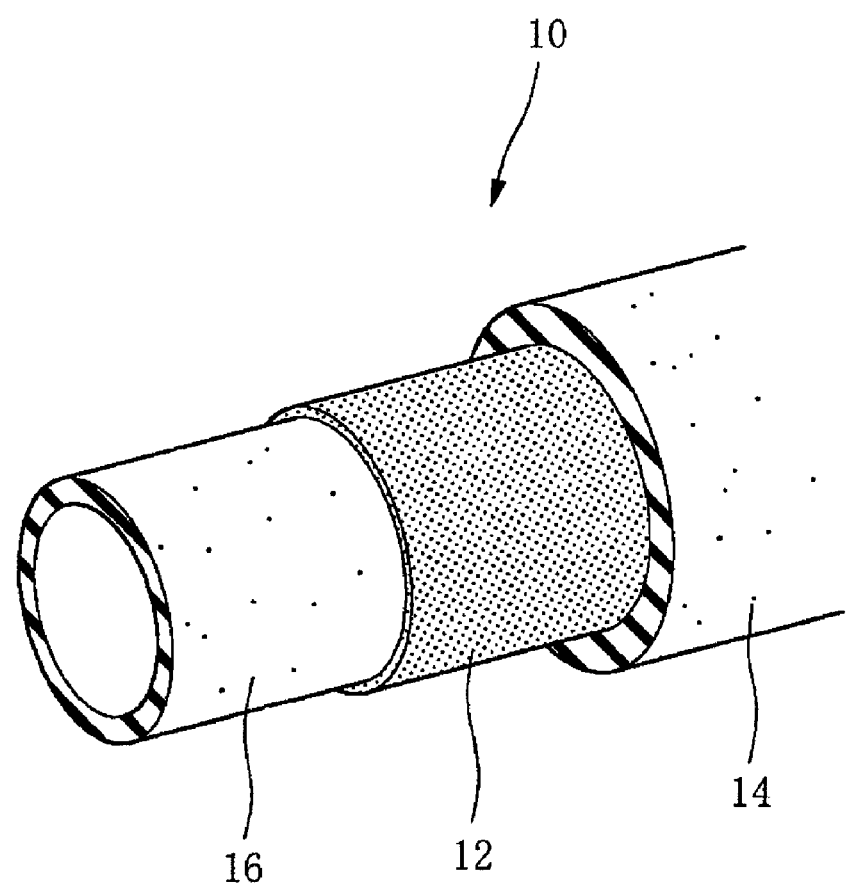
FIG. 1 is a perspective view of a resin composite hose according to one embodiment of the present invention, showing partly broken away.
Figure 2A:
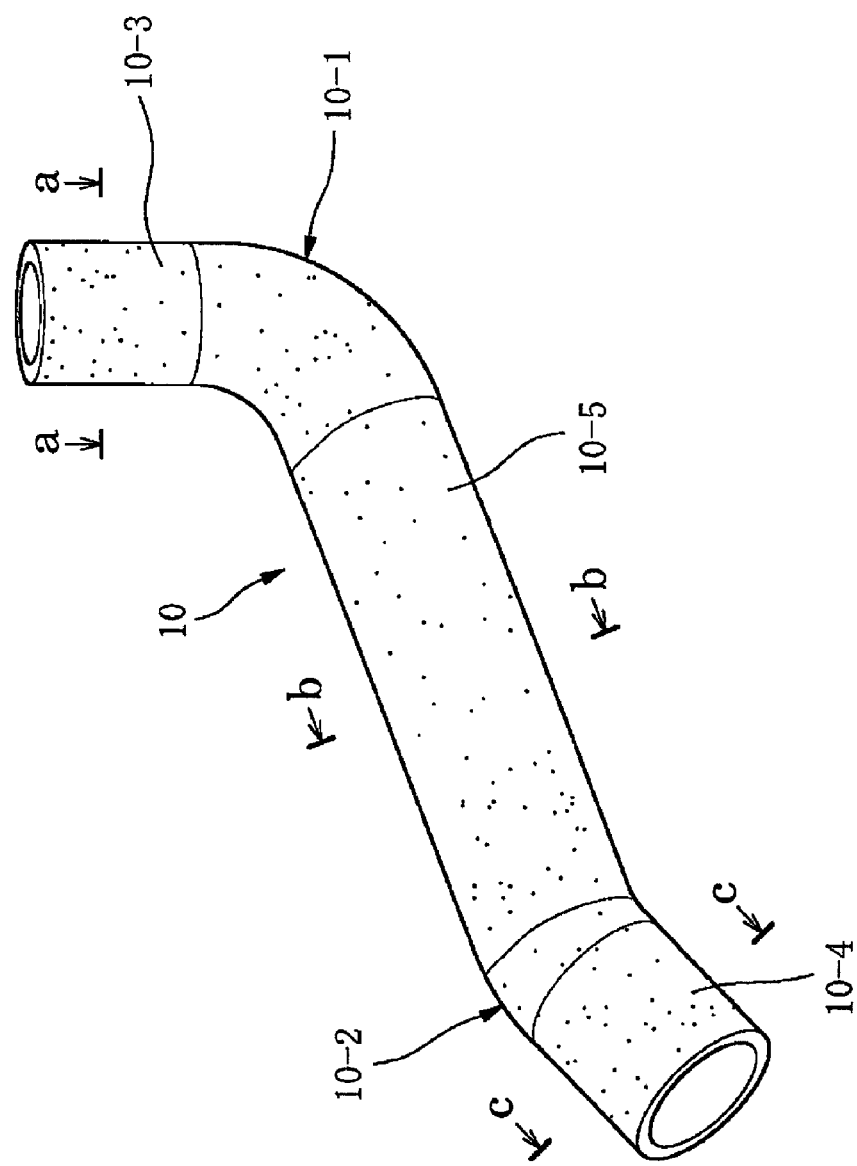
FIG. 2A is an overall perspective view showing the resin composite hose of FIG. 1.
Figure 2B:
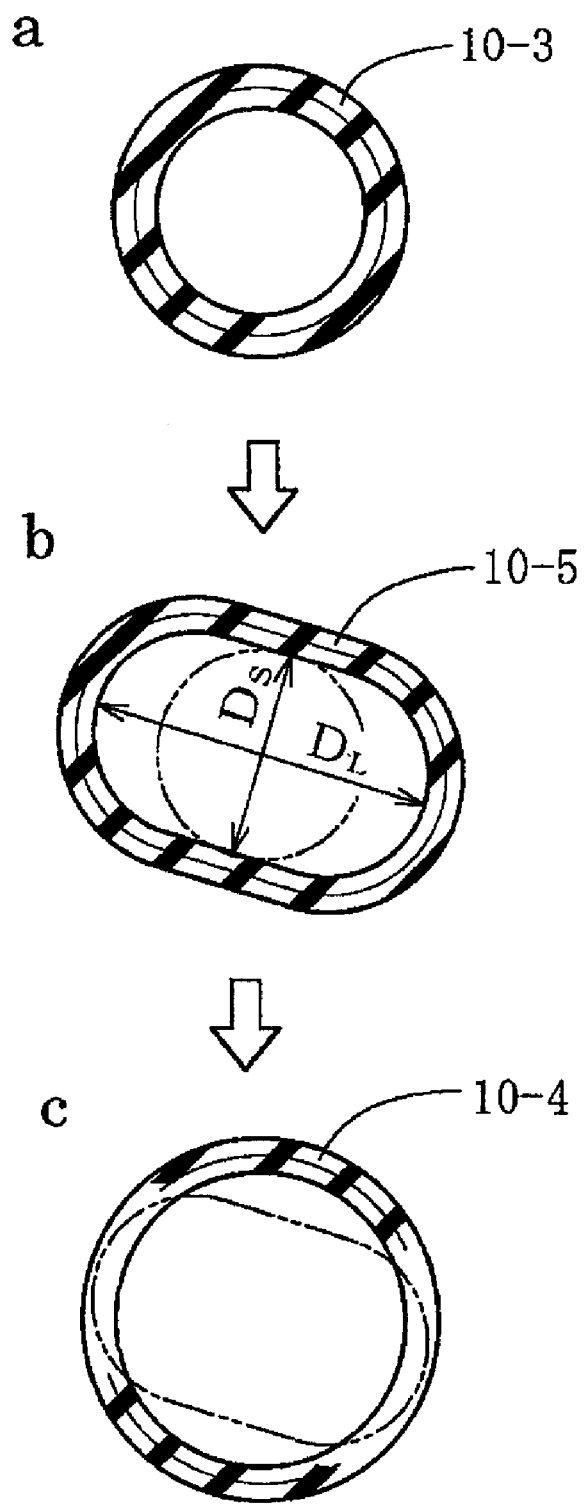
FIG. 2B is a view showing a change in shapes of a-a section, b-b section and c-c section of FIG. 2A.
Figure 2C:
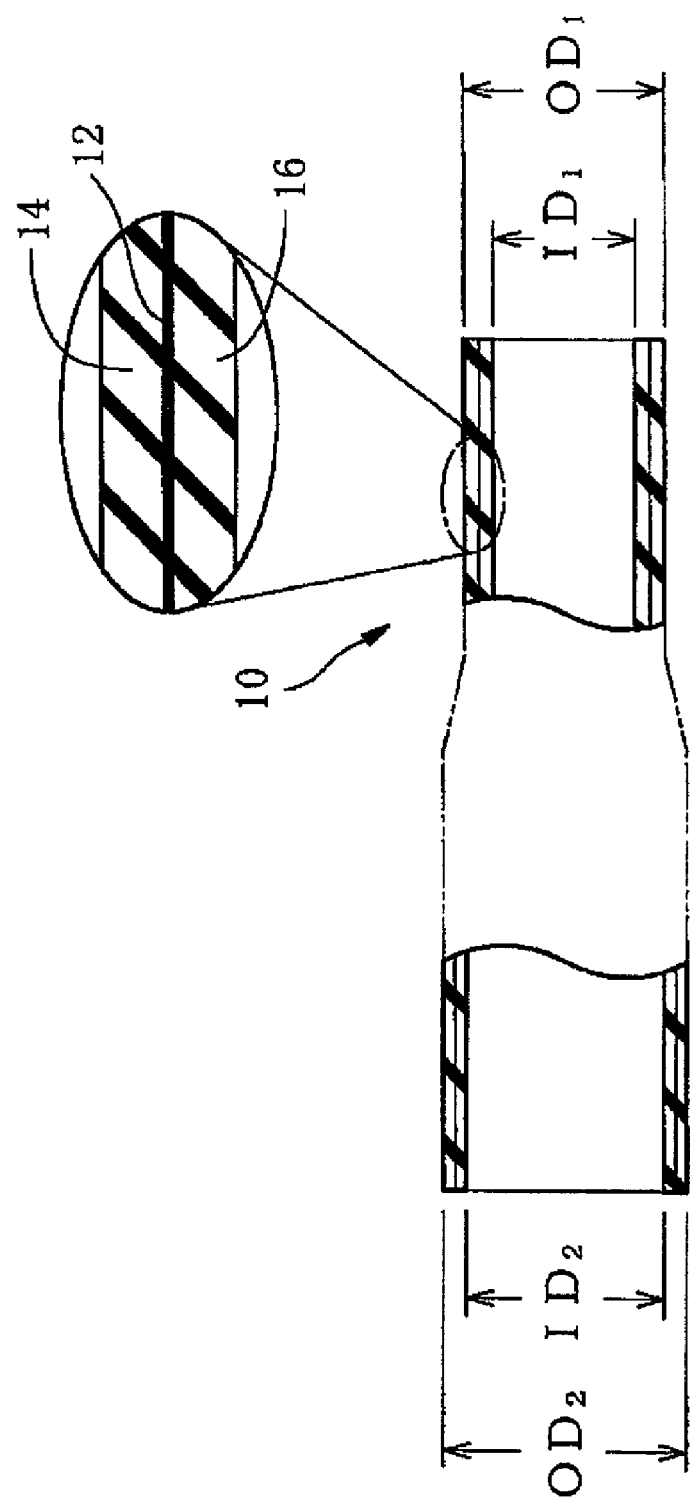
FIG. 2C is a cross-sectional view of a straight portion of the resin composite hose.

In FIGS. 1 and 2, reference numeral 10 indicates a resin composite hose (hereinafter simply referred to as a hose) as a fluid transporting hose that is suitable for a hose such as a fuel hose. The hose 10 has a multilayer construction comprising a resin layer 12 as a barrier layer having a permeation resistance to a transported fluid, an outer rubber layer 14 on an outer side of the resin layer 12, and an inner rubber layer 16 as an inner surface layer on an inner side of the resin layer 12.

Here, the resin layer 12 as a middle layer is formed to extend from one axial end to the other axial end of the hose 10, or to extend from one axial edge portion to the other axial edge portion thereof.

The hose 10 entirely has a curved or bent shape, namely has two curved portions 10-1 and 10-2 at two axial positions of the hose 10, as shown in FIG. 2A.

In this embodiment, acrylonitrile butadiene rubber (NBR) is used for the inner rubber layer 16, fluorothermoplastic copolymer consisting of at least three monomers, tetrafluoroethylene, hexafluoropropylene, and vinylidene fluoride (THV) is used for the resin layer 12, and NBR+PVC is used for the outer rubber layer 14.

Here, bonding strength between the layers (one and adjacent layers) equal to or greater than 10N/25 mm, and the layers are bonded to each other firmly. In each of samples evaluated with respect to bonding strength, peel-off does not occur on an interface of each layer, but a parent material is destroyed. The resin layer 12 and the inner rubber layer 16, the resin layer 12 and the outer rubber layer 14 are bonded to one another by vulcanizing bonding, but may be also bonded to one another by adhesive.

The inner rubber layer 16, the resin layer 12 and the outer rubber layer 14 may be made or constructed of the following materials, as well as the combination of the above materials.

Specifically, for the inner rubber layer 16, materials such as NBR (acrylonitrile content is equal to or greater than 30% by mass), NBR+PVC (acrylonitrile content is equal to or greater than 30% by mass), FKM, hydrogenated acrylonitrile butadiene rubber (H-NBR) may be suitably used.

A wall-thickness of the inner rubber layer 16 may be around 1.0 to 2.5 mm.

For the resin layer 12 as a middle layer, materials such as THV, polyvinylidene fluoride (PVDF), ethylene-tetrafluoroethylene copolymer (ETFE), polychlorotrifluoroethylene (CTFE), ethylene-vinyl alcohol (EVOH), polybutylene naphthalate (PBN), polybutylene terephtharate (PBT), polyphenylene sulfide (PPS) are suitably used.

A wall thickness of the resin layer 12 may be about 0.03 to 0.3 mm.

THV is flexible compared to EVOH and PVDF, and suitable for a barrier material for a hose with layers of resin and rubber. In comparison with Polytetrafluoroethylene (PTFE) and EVOH, ETFE and THV are easily extruded, easily laminated to a rubber, and have excellent adhesion to rubber. On the other hand, PBN and PBT are less flexible compared to THV. However, PBN and PBT are excellent in fuel permeation resistance, and can be thin-walled compared to THV. Therefore, a flexible hose can be formed also from PBN and PBT, similarly from THW.

On the other hand, for the outer rubber layer 14, materials such as NBR+PVC, epichlorohydrin-ethylene oxide copolymer (ECO), chlorosulponated polyethylene rubber (CSM), NBR+acrylic rubber (NBR+ACM), NBR+ethylene-propylene-diene rubber (NBR+EPDM), and EPDM may be suitably used.

A wall thickness of the outer rubber layer 14 may be about 1.0 to 3.0 mm.

As shown in FIG. 2A, the hose 10 has a straight tubular portion 104 on one end thereof. The straight tubular portion 10-4 extends straight in an axial direction of the hose 10, has a perfect circular shape in cross-section or in each of cross-sections of inner and outer circumferences thereof, and has a constant cross-sectional shape along the axial direction.

The hose 10 also has a straight tubular portion 10-3 on the other end thereof. The straight tubular portion 10-3 similarly extends straight in the axial direction of the hose 10, has a perfect circular shape in cross-section or in each of cross-sections of inner and outer circumferences thereof, and has a constant cross-sectional shape along the axial direction.

However, as shown in FIG. 2B, one end portion of the hose 10, namely the straight-tubular portion 10-4 has an inner diameter $ID_2$ and an outer diameter $OD_2$ that are greater than an inner diameter $ID_1$ and an outer diameter $OD_1$ of the other end portion thereof, namely the straight-tubular portion 10-3.

A curved portion 10-1 has a cross-sectional shape of a perfect circle (a perfect circular annulus) at a curve beginning end thereof, namely an end adjacent to the straight tubular portion 10-3. The curve beginning end of the curved portion 10-1 has inner diameter and outer diameter identical to those of the straight tubular portion 10-3. The curved portion 10-1 has a shape of progressively increasing a circumferential length while being flattened progressively increasingly from the curve beginning end of the perfect circle in cross-section to a curve terminal end, namely an end near the straight tubular portion 10-4 of a flattened circle (here, elongated circle) in cross-section. In the curved portion 10-1, any cross-sectional area of a fluid path, namely any inner cross-sectional area is maintained equal to or greater than that of the curve beginning end of perfect circular cross-section through its length from the curve beginning end to the curve terminal end, specifically, any cross-sectional area of the fluid path progressively increases from the curve beginning end to the curve terminal end thereof.

Figure 3A:
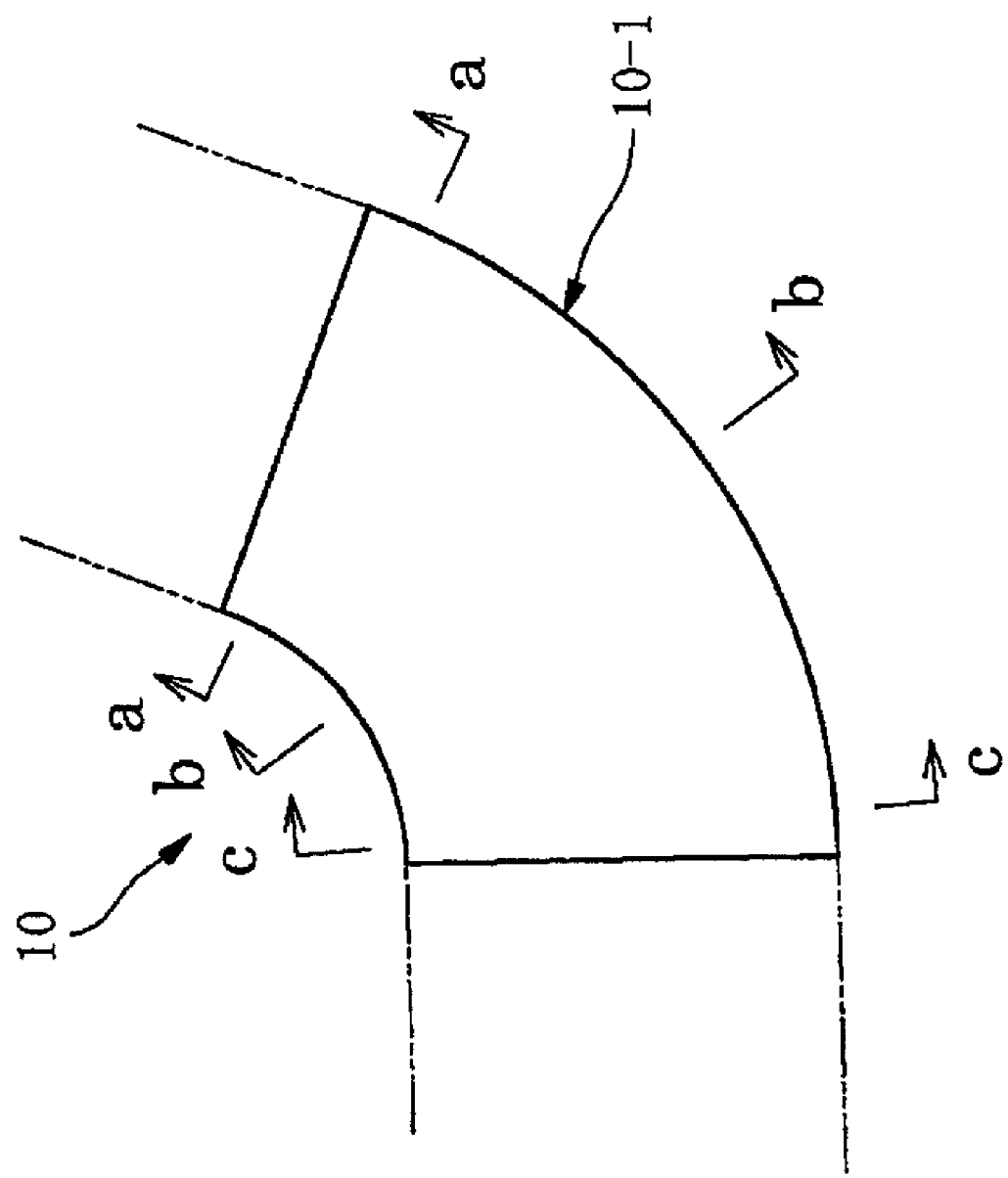
FIG. 3A is a view of a curved portion of the resin composite hose.
Figure 3B:
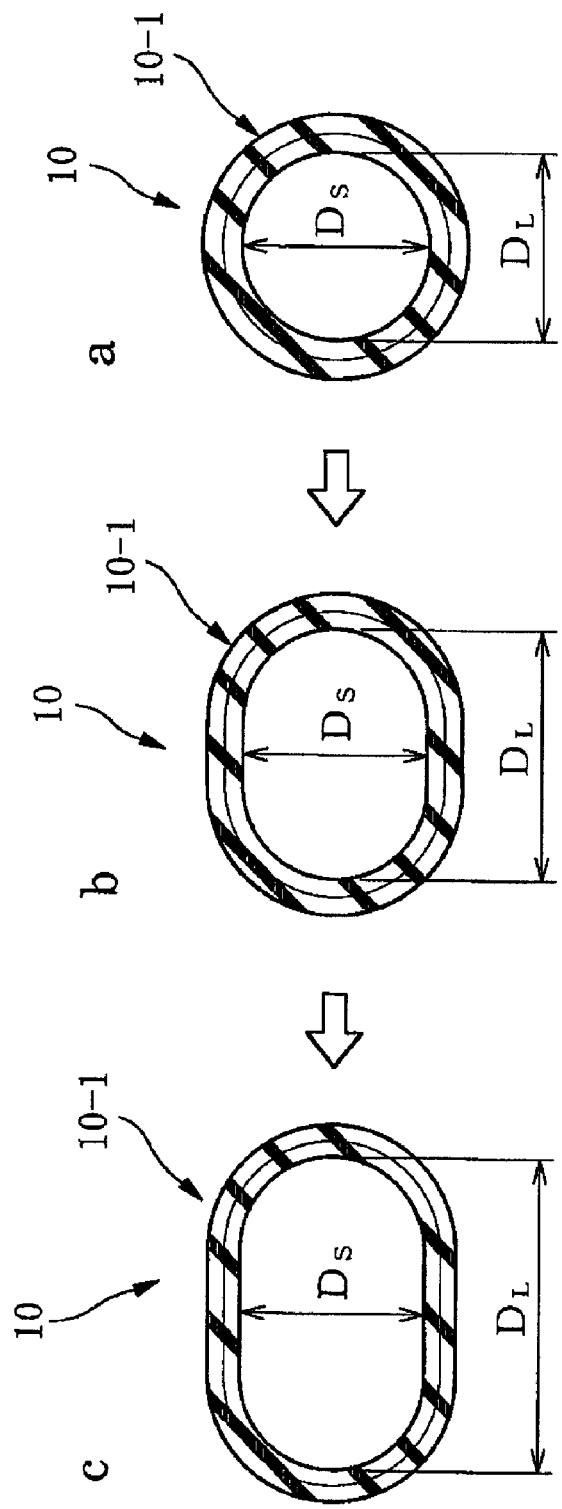
FIG. 3B is a view showing a change in shapes of a-a section, b-b section and c-c section of FIG. 3A.
Figure 4A:
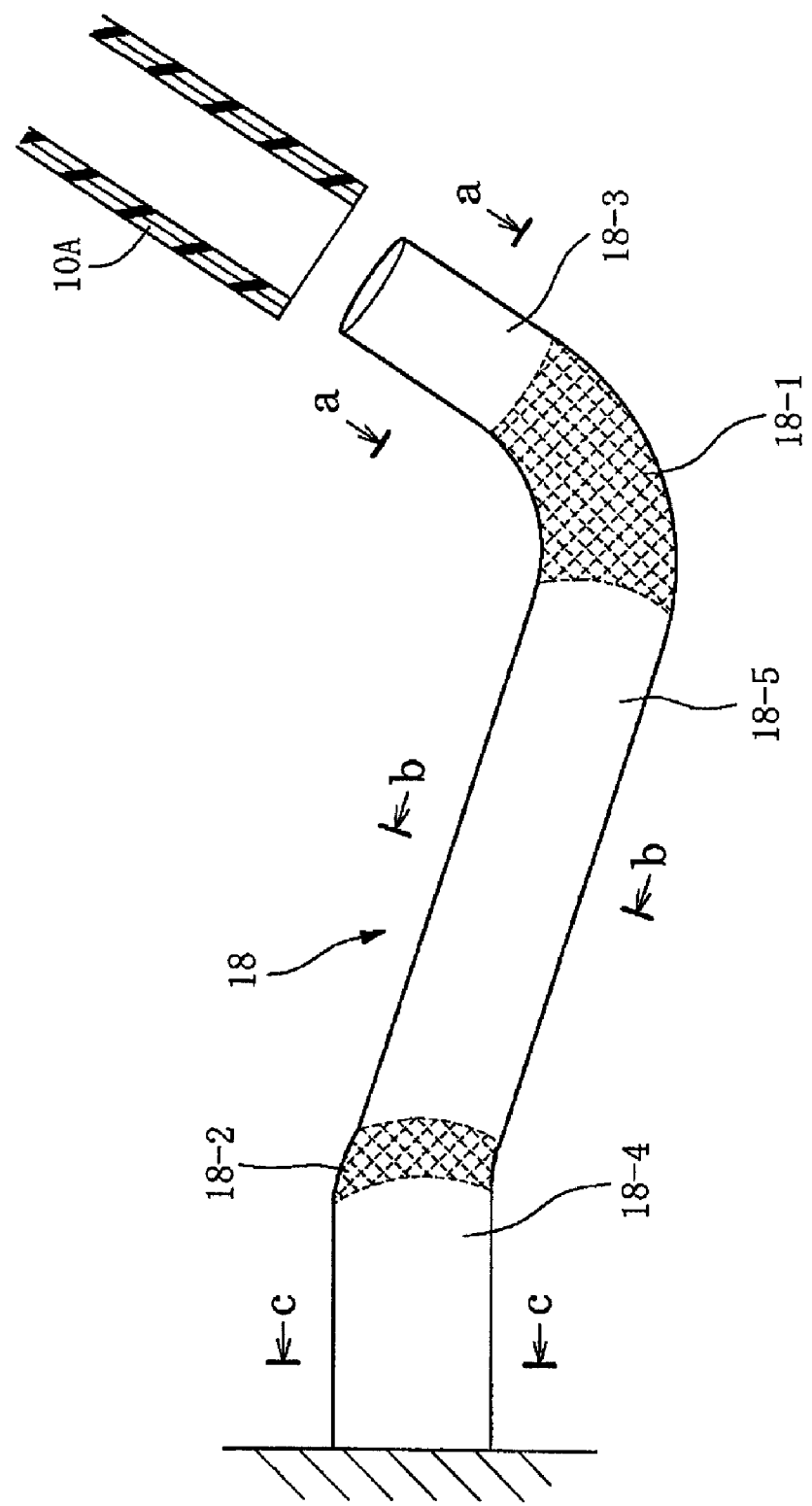
FIG. 4A is a view showing a relevant step of a method for producing the resin composite hose according to the present invention.
Figure 4B:
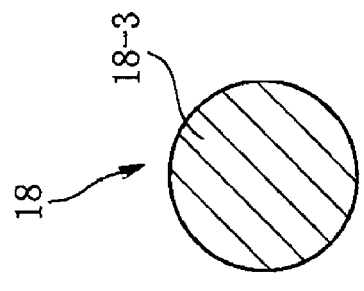
FIG. 4B is a view showing a change in shapes of a-a section, b-b section and c-c section of FIG. 4A.
Figure 4B:
Figure 4B:
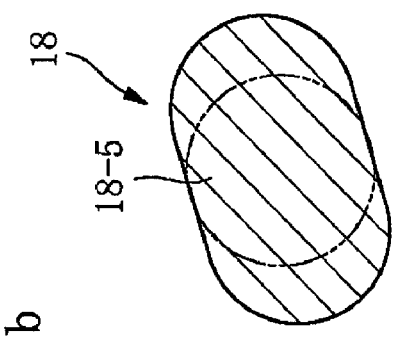
Figure 4B:
Figure 4B:
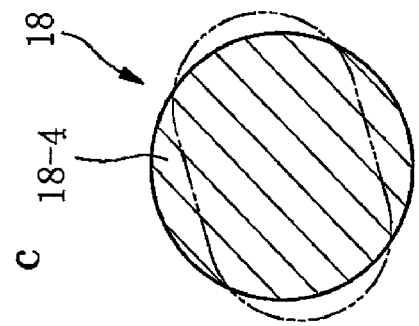

More specifically, as shown in FIG. 3, the curved portion 10-1 has a diameter, axis or minor axis $D_S$ and another diameter, axis or major axis $D_L$ that is perpendicular to the minor axis $D_S$ in a cross-sectional shape. Each of the minor axis $D_S$ and the major axis $D_L$ is an axis of a cross-sectional shape of an inner circumference of the curved portion 10-1. The minor axis $D_S$ is a diameter of the perfect circle of the curve beginning end of the curved portion 10-1. The curved portion 10-1 has a shape of progressively increasing a circumferential length while being flattened progressively increasingly from the curve beginning end to the curve terminal end in such a manner that the minor axis $D_S$ is maintained constant and the major axis $D_L$ is progressively increased.

A portion between the curved portion 10-1 and a curved portion 10-2 is defined as a straight portion 10-5 extending straight in the axial direction of the hose 10 while maintaining a constant cross-sectional shape or geometry of an elongated circle identical to the cross-sectional shape of the curve terminal end of the curved portion 10-1.

In the straight portion 10-5, a cross-sectional shape of an elongated circle has an identical minor axis $D_S$ and an identical major axis $D_L$ at any position through its length. Namely, the straight portion 10-5 has a straight shape with a constant cross sectional shape of the elongated circle of an identical minor axis $D_S$ and an identical major axis $D_L$ along the axial direction thereof.

On the other hand, a curved portion (a second curved portion) 10-2 is a portion for forming a transition in a cross-sectional shape of the hose 10 from a flattened circle to a perfect circle in a direction to the straight-tubular portion 10-4.

The second curved portion 10-2 serving as a cross-sectional shape transitional portion has a curve beginning end of an elongated circular cross-section identical to that of a terminal end of the straight portion 10-5, and a curve terminal end of a perfect circular cross-section, namely an end adjacent to the straight tubular portion 10-4, of a perfect circular cross-section. The curve terminal end of the curved portion 10-2 has an inner diameter and an outer diameter identical to those of the straight tubular portion 10-4.

In this embodiment, the second curved portion 10-2 as the cross-sectional shape transitional portion has a constant circumferential length while being progressively changed or transformed in a cross-sectional shape thereof from a flattened circular cross-sectional shape to a perfect circular cross-sectional shape. However, as the case may be, the second curved portion 10-2 may be designed to progressively increase a circumferential length while forming a transition in cross-sectional shape from a flattened circle to a perfect circle.

FIG. 4 shows a relevant step in the production method of the above hose 10 of curved shape.

In the Figure, reference numeral 18 indicates a metal mandrel that has an outer surface of curved shape corresponding an inner surface of the hose 10.

Specifically, the mandrel 18 has curved portions 18-1 and 18-2 corresponding to the curved portions 10-1 and 10-2, and straight-shaped portions 18-3 and 18-4 corresponding to the straight tubular portions 10-3 and 10-4 of the hose 10. The mandrel 18 further has a straight portion 18-5 corresponding to the straight portion 10-5 of the hose 10.

In the production method according to this embodiment, first, the inner rubber layer 16, the resin layer 12 and the outer rubber layer 14 are successively laminated on one another by extrusion to obtain an elongated straight tubular body. The elongated straight tubular body is cut to a certain length, and thereby a straight tubular hose body or a tubular hose body of a straight shape 10A that is plastically deformable and unvulcanized is obtained. This straight tubular hose body 10A has a diameter equal to the other end with a small diameter of the hose 10 to be produced.

The straight tubular hose body 10A may be semivulcanized afterward. As the case may be, the straight tubular hose body 10A may have a diameter smaller than a diameter of the other end with a small diameter of the hose 10 to be produced.

Then the straight tubular hose body 10A is fitted on the mandrel 18 and is deformed into a shape following to that of the mandrel 18. And the tubular hose body 10A with the mandrel 18 therein is put in a vulcanizing can, and is vulcanized by heating for a predetermined time to obtain a vulcanized curved tubular hose body (the hose 10 of curved shape). The vulcanized curved tubular hose body (the hose 10 of curved shape) with the mandrel 18 therein is taken out of the vulcanizing can, and the mandrel 18 is removed relatively from the vulcanized curved tubular hose body (the hose 10 of curved shape), thereby the hose 10 of curved shape shown in FIG. 2 is obtained.

Figure 5A:
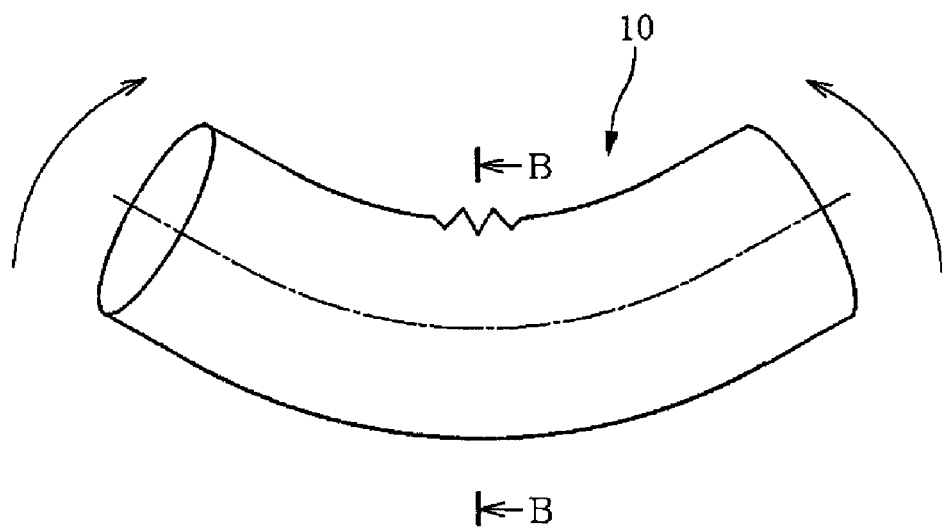
FIG. 5A is a view for explaining a disadvantage of a conventional resin composite hose.

In case that a mandrel does not have a shape of progressively increasing a circumferential length while being flattened progressively increasingly at a curved portion and has a constant shape and a constant outer diameter along its entire length unlike the mandrel 18 shown in FIG. 4, namely in case that a finished vulcanized hose has constant inner and outer diameters along its entire axial length, when a straight tubular hose body 10A before vulcanized is fitted on the mandrel of curved shape, the resin layer 12 exhibits a wave-shaped deformation behavior on an inner side of a curved portion of the mandrel as shown in FIG. 5A.

On the contrary, in the present embodiment, the mandrel 18 includes the curved portion 18-1 that has a shape of changing a cross-sectional shape thereof from a perfect circle to a flattened circle, and continuously increasing a circumferential length while being flattened progressively increasingly. Therefore, when the straight tubular hose body 10A is fitted on the mandrel 18 and is deformed, the resin layer 12 does not exhibit wave-shaped deformation behavior on an inner side of the curved portion 18-1 as well as on an outer side thereof. So, the tubular hose body can be entirely formed favorably with a curved shape as intended.

Figure 5B:
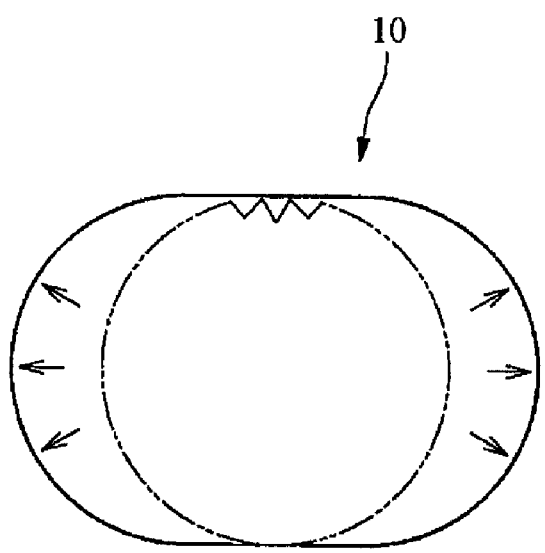
FIG. 5B is a view for explaining an advantage of the resin composite hose of the present invention.

Since the curved portion 10-1 of the hose 10, namely, the curved portion 18-1 of the mandrel 18 has a shape of progressively increasing a circumferential length while changing progressively a cross-sectional shape thereof from a perfect circle to an increasingly flattened circle along the axial direction of the hose 10. Therefore, as shown in FIG. 5B, an excessive length, slack or loosening created on an inner side of the curved portion of the resin layer 12 of the hose 10 is absorbed by an elongation in a circumferential direction, or offset with the elongation in the circumferential direction based on progressive increase of the circumferential length of the curved portion 18-1, namely diametrical or circumferential expansion of the resin layer 12. As a result, the above wave-shaped deformation can be favorably prevented from being created on the inner side of the curved portion 18-1.

As stated, according to the embodiment of the present invention, the hose 10 of curved shape can be easily produced in a small number of steps, and thereby produced at much lower cost than before.

Figure 6:
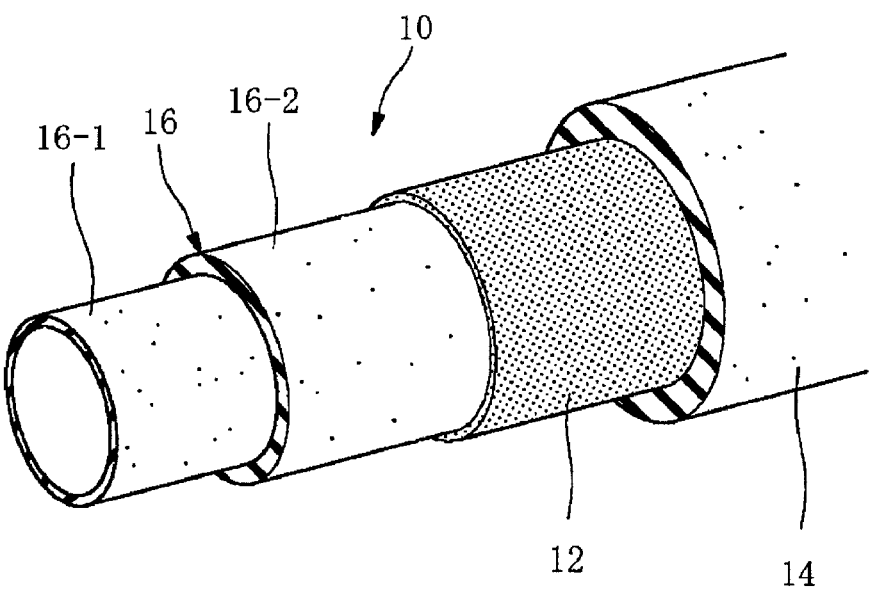
FIG. 6 is a perspective view of a modified resin composite hose according to the present invention.

In the hose 10 of the above embodiment, the inner rubber layer 16 comprises a single layer. However, as shown in FIG. 6, the inner layer 16 may have a two-layer construction that comprises a first layer (rubber layer) 16-1 defining an innermost surface and a second layer (rubber layer) 16-2 on an outer side of the first layer 16-1.

In this four-layer hose 10, bonding strength between the layers (one and adjacent layers) is equal to or greater than 10 N/25 mm, and the layers are bonded to one another firmly. In each of samples evaluated with respect to bonding strength, peel-off does not occur on an interface of each layer, but a parent material is destroyed. The resin layer 12 and the second layer 16-2, the resin layer 12 and the outer rubber layer 14 are bonded to one another by vulcanizing bonding, respectively, but may be also bonded to one another by adhesive.

In this four-layer hose 10, a material for each layer may be combined as follows.

For the first layer 16-1, materials such as FKM, NBR (acrylonitrile content is equal to or greater than 30% by mass), NBR+PVC (acrylonitrile content is equal to or greater than 30% by mass) may be suitably used.

A wall-thickness of the first layer 16-1 may be around 0.2 to 1.0 mm.

On the other hand, for the second layer 16-2, materials such as NBR (acrylonitrile content is equal to or greater than 30% by mass) or NBR+PVC (acrylonitrile content is equal to or greater than 30% by mass) may be suitably used.

A wall-thickness of the second layer 16-2 may be around 1 to 2 mm.

The resin layer 12 in the middle of the layers and the outer rubber layer 14 may be formed as stated above.

In particular, preferably, FKM having an excellent gasoline permeation resistance is used for the first layer 16-1. By making the first layer 16-1 of FKM, can be ensured not only a fuel permeation restraining function served by the resin layer 12 but also an end permeation preventing function for effectively preventing that a fuel permeates through an inner surface layer, then permeates out of an axial edge of the hose 10 at an axial end portion of the hose 10 to which a mating member such as a mating pipe is connected. For the purpose of ensuring easy connection of the hose 10 and the mating pipe or the like, the inner rubber layer 16 has a wall-thickness of equal to or greater than 1 mm. However, when the inner rubber layer 16 is entirely made of FKM, a cost of the hose 10 is increased. So, due to cost reason, for the second layer 16-2, inexpensive NBR (acrylonitrile content is equal to or greater than 30% by mass) or inexpensive NBR+PVC (acrylonitrile content is equal to or greater than 30% by mass) is used.

Figure 7:
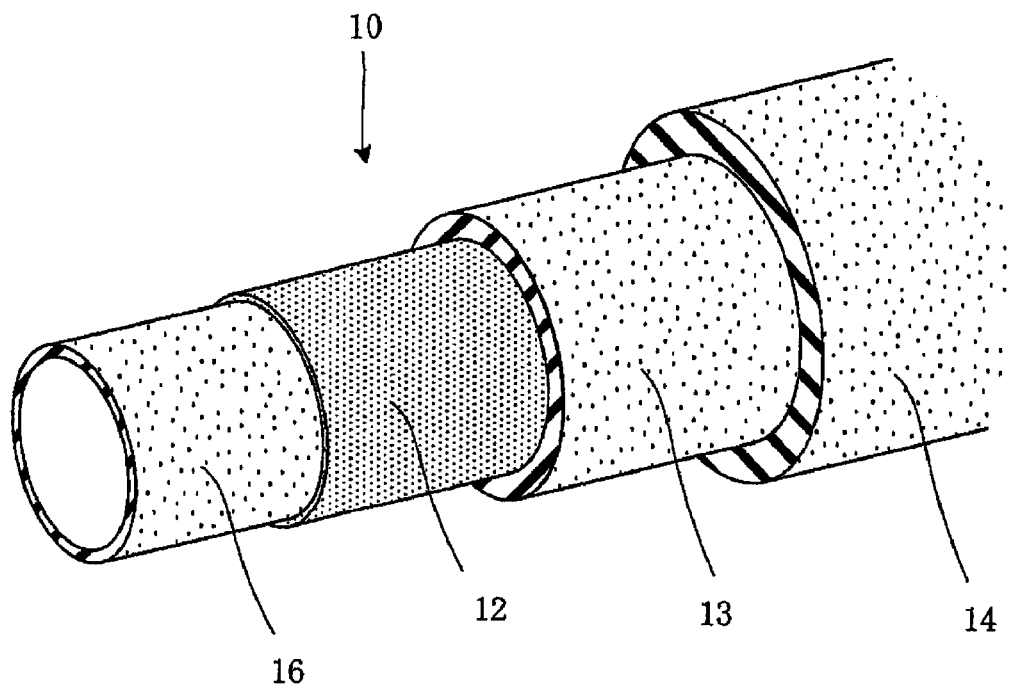
FIG. 7 is a perspective view of another modified resin composite hose according to the present invention.
Figure 8A:
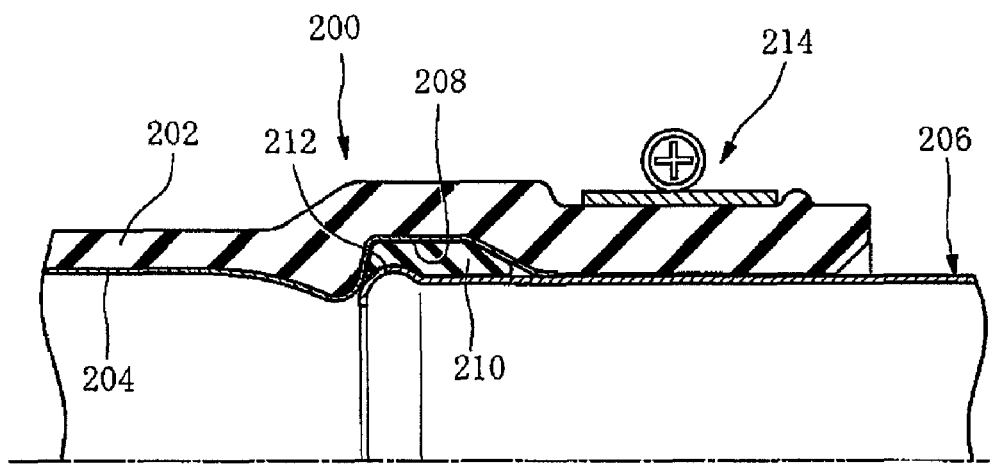
FIG. 8A is a sectional view of a conventional resin composite hose.
Figure 8B:
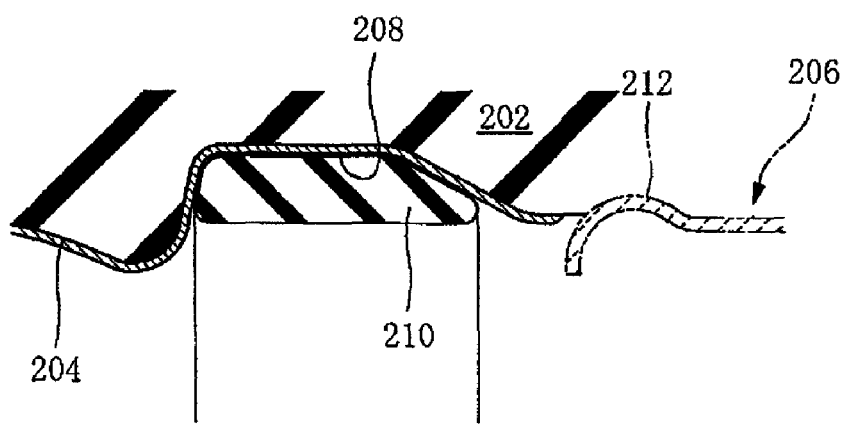
FIG. 8B is an enlarged view of a part of the conventional resin composite hose of FIG. 8A.
Figure 9:
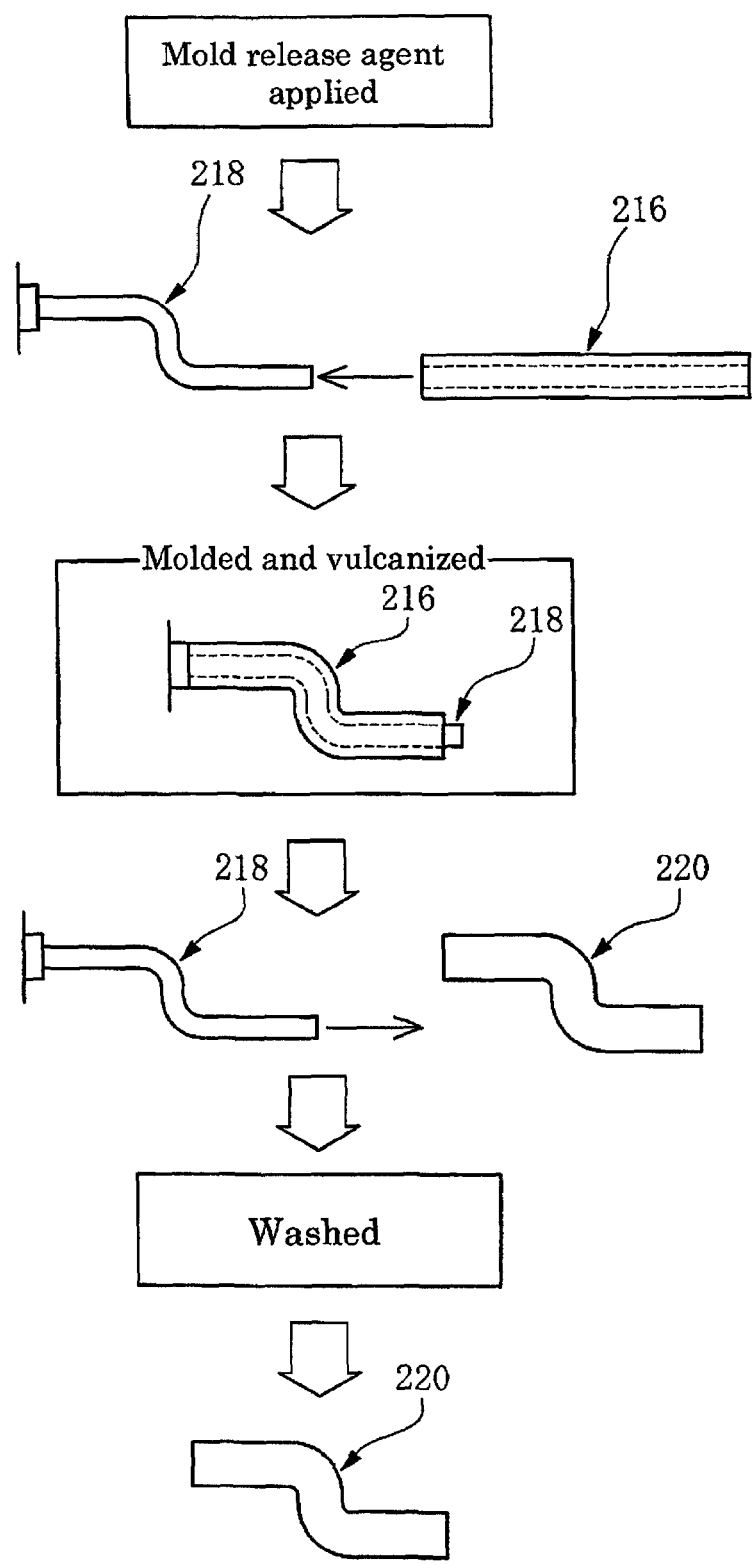
FIG. 9 is a view showing a typical production method for producing a conventional resin composite hose of curved shape.
Figure 10A:
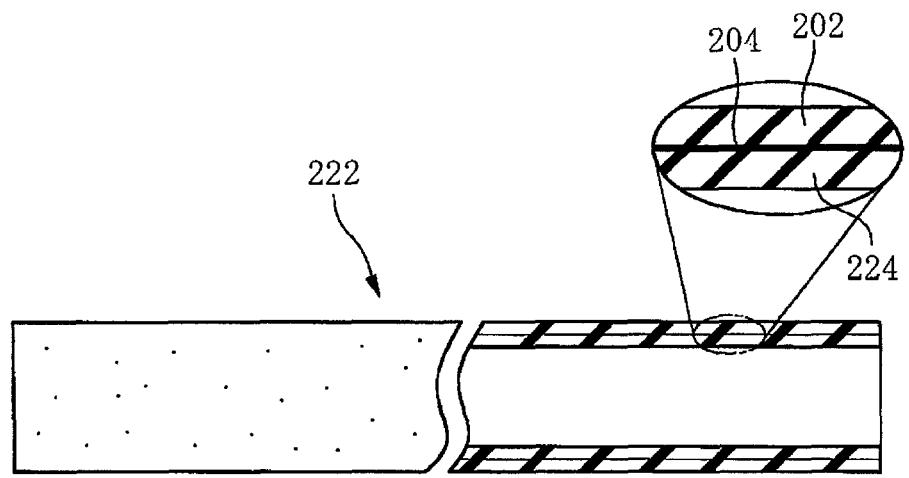
FIG. 10A is a view showing a multilayer construction of a tubular hose body.
Figure 10B:
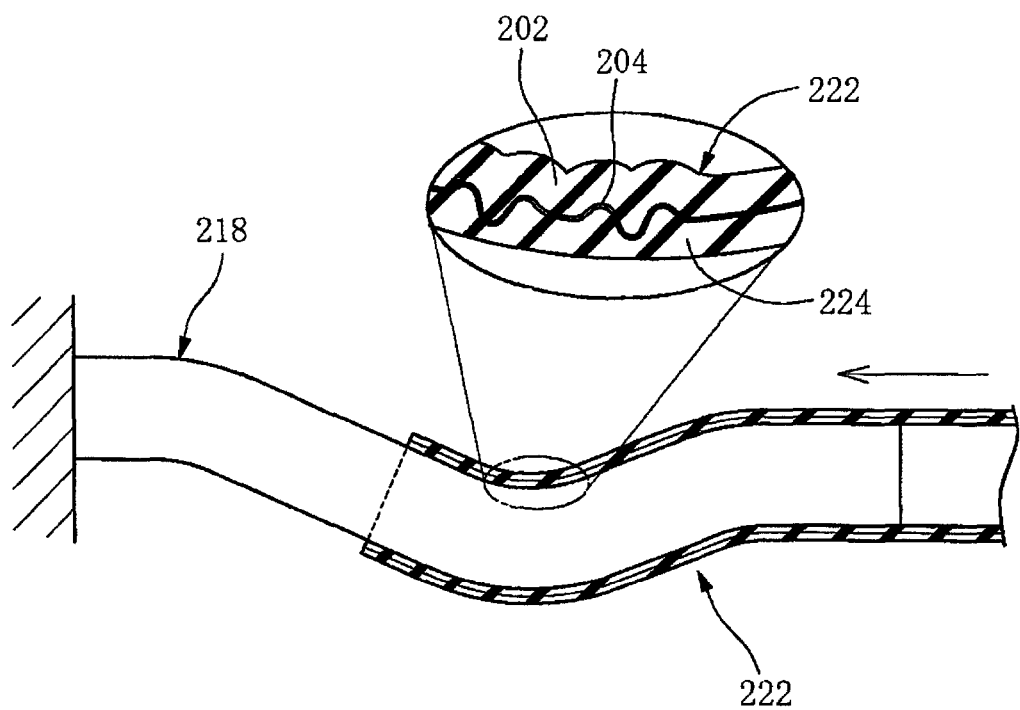
FIG. 10B is a view for explaining a failure occurred in the conventional resin composite hose of curved shape.

As shown in FIG. 7, the hose 10 may have a multilayer construction including a middle rubber layer 13 between the resin layer 12 and the outer rubber layer 14 (the middle rubber layer 13 may be regarded as a first layer of an outer rubber layer and the outer rubber layer 14 may be regarded as a second layer of the outer rubber layer).

In the hose 10 having the four-layer construction of FIG. 7, bonding strength between the layers (one and adjacent layers) is equal to or greater than 10 N/25 mm, and the layers are bonded to one another firmly. In each of samples evaluated with respect to bonding strength, peel-off does not occur on an interface of each layer, but a parent material is destroyed. The resin layer 12 and the inner rubber layer 16, the resin layer 12 and the middle rubber layer 13 are bonded to one another by vulcanizing bonding, respectively, but may be also bonded to one another by adhesive.

In the hose 10 having the four-layer construction of FIG. 7, the inner rubber layer 16, the resin layer 12, the middle rubber layer 13 and the outer rubber layer 14 may be constructed in combination of the following materials.

For the inner rubber layer 16, materials such as FKM, NBR (acrylonitrile content is equal to or greater than 30% by mass), NBR+PVC (acrylonitrile content is equal to or greater than 30% by mass) may be suitably used.

A wall-thickness of the inner rubber layer 16 may be about 0.2 to 1.0 mm.

For the resin layer 12 as a middle layer, fluoro type resin such as THV, PVDF or ETFE, and polyamide (PA) or nylon resin such as PA6, PA66, PA11 or PA12 may be suitably used.

A wall-thickness of the resin layer 12 may be about 0.03 to 0.3 mm.

On the other hand, for the middle rubber layer 13, NBR (acrylonitrile content is equal to or greater than 30% by mass), NBR+PVC (acrylonitrile content is equal to or greater than 30% by mass), ECO, CSM, NBR+ACM, NBR+EPDM, butyl rubber (IIR), EPDM+IIR, or EPDM may be suitably used.

A wall-thickness of the middle rubber layer 13 may be about 0.2 to 2.0 mm.

For the outer rubber layer 14, materials such as NBR (acrylonitrile content is equal to or greater than 30% by mass), NBR+PVC (acrylonitrile content is equal to or greater than 30% by mass), ECO, CSM, NBR+ACM, NBR+EPDM, IIR, EPDM+IIR, and EPDM may be suitably used.

A wall-thickness of the outer rubber layer 14 may be about 1 to 3 mm.

Meanwhile, total wall-thickness, namely a suitable wall-thickness of the hose 10 of FIG. 7 is about 2.5 to 6.0 mm. When the wall-thickness of the hose 10 is less than 2.5 mm, a gasoline permeation resistance of the hose 10 is insufficient.

When the wall-thickness of the hose 10 is greater than 6 mm, a flexibility of the hose 10 is insufficient.

Here, when the outer rubber layer 14 (the second layer of the outer rubber layer) or the middle rubber layer 13 (the first layer of the outer rubber layer) is made of IIR or EPDM+IIR, the outer rubber layer 14 or the middle rubber layer 13 is provided with a gasoline fuel permeation resistance, and serves as a barrier layer since IIR and EPDM+IIR have alcohol resistance. Therefore, even when the resin layer 12 is formed thin-walled to enhance flexibility or elasticity of the hose 10, gasoline fuel permeation resistance of the hose 10 does not become insufficient. And, even when the resin layer 12 is made of inexpensive PA or nylon resin instead of fluoro type resin having an excellent gasoline permeation resistance, sufficient gasoline fuel permeation resistance of the hose 10 can be maintained.

Then, the test samples of hoses including middle rubber layers made of IIR are evaluated with respect to a gasoline permeation resistance and the results are shown in Table 1.

The evaluation is conducted in the following manner. Four test samples or specimens of hoses (A), (B), (C) and (D), each having an inner diameter of 24.4 mm, a wall-thickness of 4 mm, and a length of 300 mm, are prepared. The test sample (A) has a three-layer construction including an inner rubber layer of NBR, a resin layer of THV (specifically, TH815: THV815 is a product number of a product commercially available under the trademark Dyneon from Dyneon, LLC), and an outer rubber layer of NBR+PVC, the test sample (B) has a four-layer construction including an inner rubber layer of NBR, a resin layer of THV (THV815, wall-thickness 0.11 mm), a middle rubber layer of IIR (a first layer of an outer rubber layer) and an outer rubber layer of NBR+PVC (a second layer of the outer rubber layer), the test sample (C) has a four-layer construction including an inner rubber layer of NBR, a resin layer of THV (THV815, wall-thickness of 0.08 mm), a middle rubber layer of IIR (a first layer of an outer rubber layer) and an outer rubber layer of NBR+PVC (a second layer of the outer rubber layer), and the test sample (D) has a four-layer construction including an inner rubber layer of NBR, a resin layer of nylon (PA11), a middle rubber layer of IIR (a first layer of an outer rubber layer) and an outer rubber layer of NBR+PVC (a second layer of the outer rubber layer). In the columns of "Specimen" and "Wall-thickness" of Table 1, materials and wall-thicknesses only of the resin layers and the middle rubber layers (materials and wall-thicknesses only of the resin layer and the outer rubber layer in the test sample (A)) are indicated, respectively. In each of the test samples (A), (B), (C) and (D), a round-chamfered metal pipe of an outer diameter of 25.4 mm provided with two bulge portions (maximum outer diameter of 27.4 mm) is press-fitted in each end portion thereof, and one of the metal pipes is closed with a plug. And, a test fluid (Fuel C+ethanol (E) 10 volume %) is supplied in each of the test samples (A), (B), (C) and (D) via the other of the metal pipes, and the other of the metal pipes is closed with a plug of screw type to enclose the test fluid in each of the test samples (A), (B), (C) and (D). Then, each of the test samples (A), (B), (C) and (D) is allowed to stand at 40° C. for 3000 hours (the test fluid is replaced every 168 hours). Then, permeation amount of carbon hydride (HC) is measured with respect to each of the test samples (A), (B), (C) and (D) every day for three days based on DBL (Diurnal Breathing Loss) pattern by a SHED (Sealed Housing for Evaporative Detection) method according to CARB (California Air Resources Board). With regard to each of the test samples (A), (B), (C) and (D), applied is a permeation amount on a day when a maxim permeation amount is detected.

TABLE 1

|  | A | B | C | D |
|---|---|---|---|---|
| Specimen | *[1]THV815/ NBR + PVC | THV815/IIR | THV815/IIR | PA11/IIR |
| Wall-thickness (mm) | 0.11/2.16 | 0.11/1.9 | 0.08/1.9 | 0.20/1.9 |
| Permeation amount (mg/hose) | 4.2 | 2.7 | 4.2 | 3.8 |

Note:
*[1]THV815 is a product number of a product commercially available under the trademark Dyneon from Dyneon LLC.

As appreciated from the results of Table 1, the permeation amount of HC is the same, namely 4.2 mg/hose, between the test sample (A) including the outer rubber layer made of NBR+PVC and the test sample (C) including the middle rubber layer made of IIR. However, in terms of a wall-thickness of the resin layer, the test sample (A) includes the resin layer of a wall-thickness 0.11 mm that is greater than the wall-thickness 0.08 mm of the test sample (C). Therefore, when a hose includes a rubber layer made of IIR, an equivalent gasoline permeation resistance can be ensured by constructing a resin layer with a wall-thickness decreased by about 30%. Between the test sample (A) including the outer rubber layer made of NBR+PVC and the test sample (B) including the middle rubber layer made of IIR, a wall-thickness of the resin layer is the same, 0.11 mm. However, the permeation amount of HC is different, namely 4.2 mg/hose in the test sample (A) and 2.7 mg/hose in the test sample (B). When a hose includes a resin layer of an identical wall-thickness, HC permeation resistance can be decreased by about 35% by making a rubber layer of IIR. Further, in the test sample (D) including the middle rubber layer made of IIR and the resin layer made of PA11, a permeation amount of HC can be decreased by about 10% compared to the test sample (A) by increasing the wall-thickness of the resin layer by about 80%. This evaluation can basically apply also to a hose including a middle rubber layer made of EPDM+IIR.

As such, when a hose is constructed with four layers by combining materials suitably selected from the above, a permeation resistance to a transported fluid can be further enhanced, a resistance to a sour gasoline can be further enhanced, or a heat resistance or a resistance to alcohol gasoline can be also enhanced in a fuel hose. And, flexibility of the hose can be improved by decreasing a wall-thickness of a resin layer of the hose.

Although the preferred embodiments have been described above, these are only some of embodiments of the present invention.

For example, according to the present invention, in a hose having a plurality of curved portions, each of the curved portions may have a shape of progressively increasing a circumferential length while being flattened in a cross-sectional shape. However, when a curved portion has a small curvature and a short axial length, and in particular, a wave-shaped deformation is not created on an inner side of the curved portion, it is not necessary to design the curved portion to have a shape of progressively increasing a circumferential length while being flattened.

The curved portion 10-2 in the embodiment shown in FIG. 2 is such type of the curved portion that has a small curvature and a short axial length.

In the above embodiment, a flattened circle of a cross-sectional shape of the curved portion 10-1 is specifically an elongated circle. However, as the case may be, the flattened circle of the cross-sectional shape of the curved portion 10-1 may be an ellipse.

Moreover, in this embodiment, the hose 10 is provided at an axial position thereof with exactly one curved portion having a shape of progressively increasing a circumferential length while being flattened. However, the hose 10 may be provided with a plurality of such curved portions at a plurality of axial positions thereof.

In this embodiment, the present invention is applied to a hose having a larger diameter at one end thereof with respect to the other end thereof. However, the present invention may be applied to a hose having the same diameter at both ends thereof.

Also, a cross-sectional shape transitional portion may be provided on another position for forming a transition in a cross-sectional shape from a flattened circle formed via a curved portion to a perfect circle. Or, the curved portion may be designed such that a cross-sectional shape is a perfect circle at a curve beginning end, then flattened progressively increasingly to a flattened circle of a curve middle portion, and then transformed progressively to a perfect circle of a curve terminal end.

As such, the present invention can be applied to various types of hoses for various applications. The present invention can be embodied by a variety of modifications without departing from the scope of the invention.

What is claimed is:

1. A resin composite hose including a first curved portion at an axial position thereof, and having a multilayer construction, the resin composite hose comprising:

a resin layer having permeation resistance to a transported fluid and serving as a barrier layer, an inner rubber layer as an inner surface layer laminated on an inner side of the resin layer and an outer rubber layer laminated on an outer side of the resin layer, wherein the first curved portion has a shape that progressively increases in circumferential length and progressively flattens from a curve beginning end having a perfect circle cross-sectional shape to a curve terminal end having a flattened circle cross-sectional shape, wherein a cross-sectional area of a fluid path of the curve beginning end defines a minimum cross-sectional area of a fluid path through the first curved portion, wherein the first curved portion has a cross-sectional shape having a first axis passing from side to side thereof through a center thereof and a second axis passing from side to side thereof through the center thereof and perpendicular to the first axis, and the first curved portion is flattened progressively increasingly from the curve beginning end to the curve terminal end such that the first axis of the cross-sectional shape is maintained constant and the second axis of the cross-sectional shape is progressively increased, wherein a second curved portion is provided at an axial position other than the axial position of the first curved portion, and the second curved portion has a cross-sectional shape transitional portion that progressively changes in cross-sectional shape from a flattened circle cross-sectional shape of a curve beginning end thereof to a perfect circle cross-sectional shape of a curve terminal end thereof, and wherein a straight portion is provided between the first curved portion and the second curved portion, and the straight portion extends straight in an axial direction of the resin composite hose with a cross-sectional shape thereof being maintained in a flattened circle identical to the cross-sectional shape of the curve terminal end of the first curved portion.

2. The resin composite hose as set forth in claim 1, wherein the curve terminal end of the first curved portion, the curve beginning end of the cross-sectional shape transitional portion of the second curved portion, and the straight portion have a flattened circle cross-sectional shape that is elliptical.

3. The resin composite hose as set forth in claim 1, wherein the cross-sectional area of the fluid path of the first curved portion progressively increases from the curve beginning end towards the curve terminal end.

4. The resin composite hose as set forth in claim 1, wherein the first curved portion has inner and outer sides that are located at opposite ends of the first axis of the cross-sectional shape of the first curved portion.

5. The resin composite hose as set forth in claim 1, wherein the second curved portion is formed such that a minor axis of the cross-sectional shape transitional portion of the second curved portion increases.

6. An elongated resin composite hose defining a fluid flow path, the fluid flow path having a cross-sectional area defined by a minor diameter and a major diameter perpendicular to the minor diameter, wherein the resin composite hose comprises:

a fluid-impermeable resin layer having an inner surface and an outer surface;

an inner rubber layer bonded to the inner surface of the resin layer;

an outer rubber layer bonded to the outer surface of the resin layer; and a first curved portion having a first end and a second end, wherein the minor diameter remains constant from the first end to the second end of the first curved portion and the major diameter increases from the first end to the second end of the first curved portion, such that a cross-sectional shape of the second end of the first curved portion is a flattened circle.

7. The resin composite hose of claim 6, wherein the minor diameter of the first end of the first curved portion is equal to the major diameter of the first end of the first curved portion, such that a cross-sectional shape of the first end of the first curved portion is a perfect circle.

8. The resin composite hose of claim 6, wherein the cross-sectional shape of the second end of the first curved portion is an ellipse.

9. The resin composite hose of claim 6, further comprising a second curved portion having a first end and a second end, wherein the major diameter is greater than the minor diameter at the first end, thus defining a cross-sectional shape of a flattened circle, and the major diameter is equal to the minor diameter at the second end, thus defining a cross-sectional shape of a perfect circle.

10. The resin composite hose of claim 9, wherein the minor diameter progressively increases from the first end of the second curved portion to the second end of the second curved portion.

11. The resin composite hose of claim 9, further comprising a straight portion disposed between the first curved portion and the second curved portion, wherein the straight portion comprises:

a first end having the same major and minor diameters, and thus cross-sectional shape, as the second end of the first curved portion, and a second end having the same major and minor diameters, and thus cross-sectional shape, as the first end of the second curved portion, wherein the second end of the first curved portion and the first end of the second curved portion have the same minor and major diameters such that the straight portion maintains a constant cross-sectional shape of a flattened circle.

12. The resin composite hose of claim 11, wherein the cross-sectional shape of each of the first curved portion, straight portion, and second curved portion provides a constant fluid-flow area from the first end of the first curved portion to the second end of the second curved portion.

13. The resin composite hose of claim 11, wherein the cross-sectional shape of each of the first curved portion, straight portion, and second curved portion provides an increasing fluid-flow area from the first end of the first curved portion to the second end of the second curved portion.

* * * * *